United States Patent [19]
Erlenbusch et al.

[11] 3,958,823
[45] May 25, 1976

[54] AUTOMATIC GATE FOR A BALE ACCUMULATOR

[75] Inventors: Gary L. Erlenbusch; Richard H. Mott, both of Sioux Falls, S. Dak.

[73] Assignee: Du-Al Manufacturing Company, Sioux Falls, S. Dak.

[22] Filed: July 5, 1974

[21] Appl. No.: 485,903

[52] U.S. Cl............................... 292/226; 292/108; 56/475
[51] Int. Cl.². .................... A05C 3/16; A05C 19/10
[58] Field of Search.................... 292/226, 136, 108; 56/475

[56] References Cited
UNITED STATES PATENTS

| 613,659 | 11/1898 | Brown, Jr. | 292/226 |
| 716,669 | 12/1902 | Connolly | 292/136 |
| 1,497,947 | 6/1924 | Schwab | 292/226 |
| 1,593,446 | 7/1926 | Freysinger | 292/226 |
| 2,202,284 | 5/1940 | Crowe | 292/136 |
| 2,703,431 | 3/1955 | Tatom | 292/108 |
| 2,749,167 | 6/1956 | Love | 292/226 |
| 3,225,532 | 12/1965 | Rust | 56/475 |
| 3,779,402 | 12/1973 | Erlenbusch et al. | 56/475 |

*Primary Examiner*—Robert L. Wolfe
*Assistant Examiner*—Victor N. Sakran
*Attorney, Agent, or Firm*—Hill, Gross, Simpson, Van Santen, Steadman, Chiara & Simpson

[57] ABSTRACT

An improved gate for a bale accumulator which prevents bouncing of the latching mechanisms so that the gate passes by and is unlocked. Automatic bale accumulators accumulate bales of hay and release them when the accumulator is filled; and after all of the bales have passed out of the accumulator, the rear gate closes and is latched. The present invention assures positive latching such that the gate does not move the latching mechanism to a position so that the gate fails to latch.

1 Claim, 5 Drawing Figures

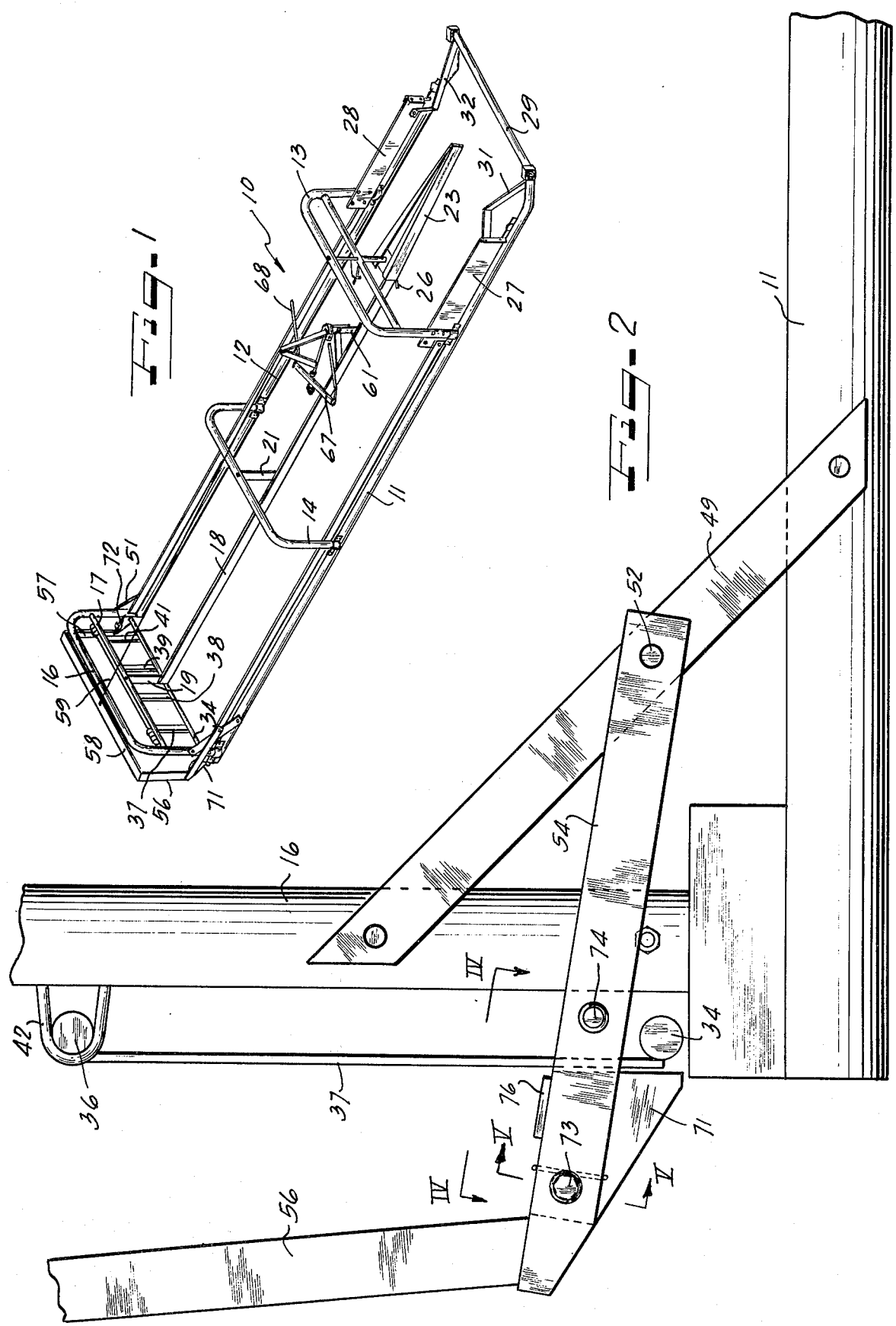

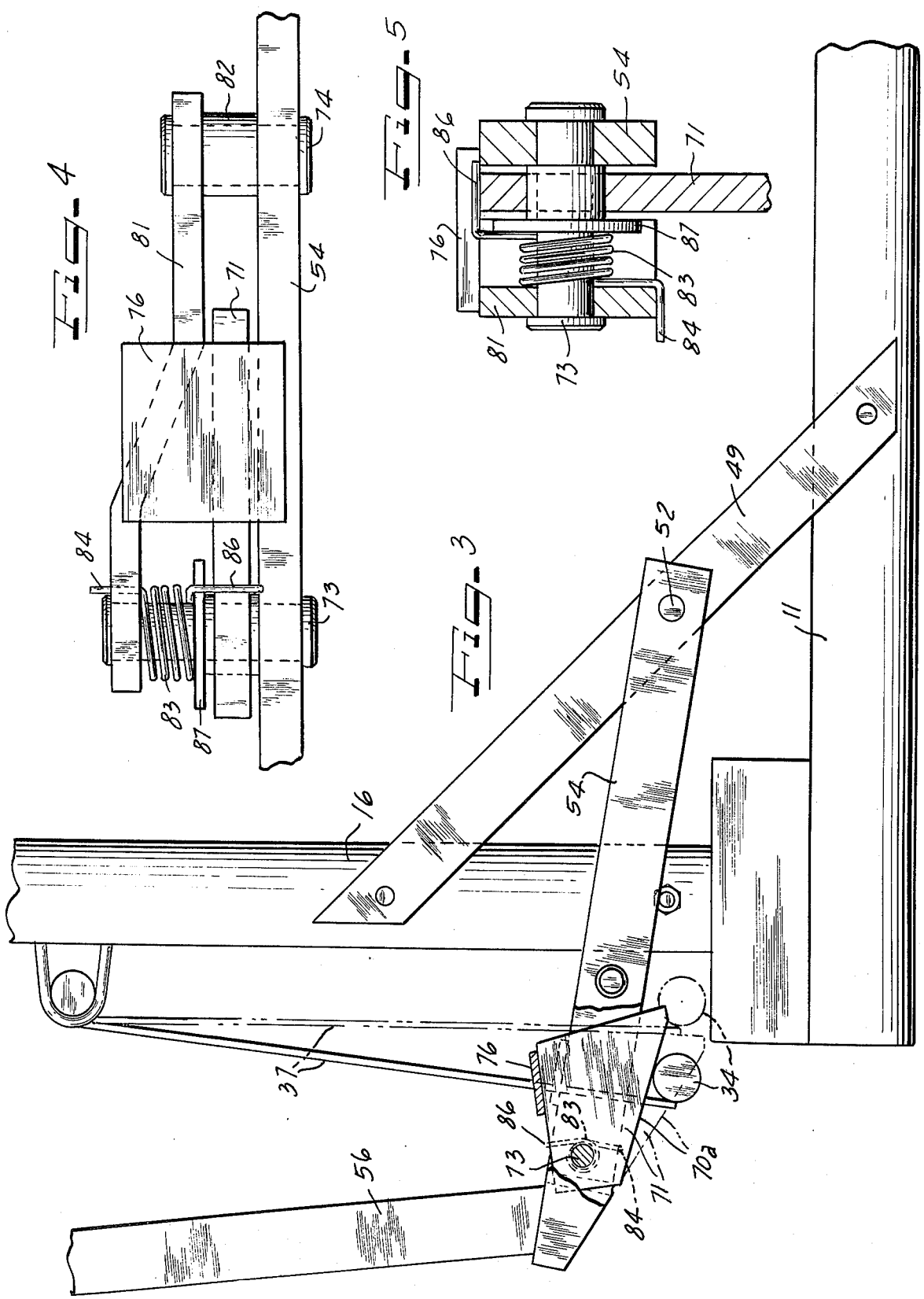

AUTOMATIC GATE FOR A BALE ACCUMULATOR

CROSS REFERENCES TO RELATED PATENTS

This invention is an improvement on U.S. Pat. No. 3,779,402, entitled "Automatic Gate for Hay Bale Accumulator", which was filed on Oct. 2, 1972, and which issued on Dec. 18, 1973.

BACKGROUND OF THE INVENTION

1. Field of the Invention

This invention relates in general to automatic bale accumulators and in particular to an improved latching mechanism.

2. Description of the Prior Art

The automatic hay bale accumulator disclosed in U.S. Pat. No. 3,779,402 is pulled over the ground to accumulate bales of hay and automatically discharges the bales when the accumulator is filled. A rear gate is pivotally supported and is automatically unlatched when the accumulator is filled and allows the bales to pass out of the accumulator. After the last bale has passed out of the accumulator, the gate falls to the closed position and a lower locking shaft on the gate strikes the tapered portion of the gate latch mechanism to force the entire gate latch upwardly so that the gate can pass under it and lock. At times the weight of the gate latch is greater than the force applied by the closing gate and the gate may not raise the latch and the gate may remain unlocked and thus allow the bales to pass through the accumulator. At other times the inertia force provided by the downward swinging gate as it closes is so great that it causes the latches to bounce upwardly with such a velocity that it strikes the upper limiting stops with great force. It then swings downwardly with great velocity striking the lower stop with such force that it bounces upwardly again which allows the gate to strike its stop on its downward pivotal movement and bounce to a position such that the latches do not catch the gate and the gate will then be unlocked leaving the gate open which is, of course, undesirable.

SUMMARY OF THE INVENTION

The present invention relates to an improved locking mechanism for an automatic gate for a hay bale accumulator and provides two spring loaded pivotally mounted latches on the gate locking mechanism and when the gate swings from the unlocked to the down position, the gate shaft strikes and raises the two small latches and passes behind them and the latches are then forced downwardly by a pair of springs to lock the gate in the closed position. Thus, when the gate swings down, the entire gate latching mechanism does not swing upwardly as in prior art devices, but only the small latches move upwardly to allow the gate shaft to pass under and to be locked due to the spring bias on the latches which move the latches down behind the gate locking shaft.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a perspective view of a hay bale accumulator.

FIG. 2 is an enlarged detailed view of the improved latching mechanism of the present invention with the gate in the latched position.

FIG. 3 is an enlarged view illustrating the gate engaging the latches.

FIG. 4 is a top view of the latch mechanism; and

FIG. 5 is a sectional view of the latch mechanism taken on line V—V.

DESCRIPTION OF THE PREFERRED EMBODIMENTS

FIG. 1 is a perspective view of the hay bale accumulator designated generally as 10 and comprises a pair of longitudinally extending sled runner frame members 11 and 12 which are formed with upwardly extending front portions joined by a crossbar 29 over which the bales of hay can pass and to which are attached the director stops 31 and 32. A plurality of U-shaped cross frame members 13 and 14 and 16 have their lower ends attached to the sled runners 11 and 12 and extend upwardly and across with room beneath them so that the bales can pass therethrough. A center longitudinal divider member 18 is supported from a crossbar 17 of the frame member 16 by a brace 19 and from the cross member 14 by a brace 21.

A bale director 23 is pivotally attached to the cross member 13 and is formed with ears 26 on either side for the engaging the bales as they pass therethrough so as to move the bale director from side to side. A suitable over-the-center spring holds the bale director in a position until another bale moves it to the opposite side. Bale holding panels 27 and 28 are mounted adjacent the bale director on the runners 11 and 12, respectively. The end gate comprises a crossbar 36 pivotally attached to member 17 by hinges 42 and has downwardly extending members 37, 38, 39, and 41. A latch rod 34 is attached at the lower ends of the members 37, 38, 39, and 41.

A latch mechanism comprises a U-shaped member 58 having downwardly extending legs 56 and 57 which are pivotally connected on either side as, for example, by link 54 to a brace member 49 which is attached between the sled runner 11 and the upright member 16 as shown in FIG. 2. A cable 59 extends from the member 58 to a trip mechanism 67, which is supported on an upright 61 attached to the center member 18 and as described in U.S. Pat. No. 3,779,402, when the bale accumulator is full, the mechanism 67 pivots upwardly thus causing the latching mechanism with the U-shaped member 58 to move upwardly thus removing the latches from engagement with the extending ends of the crossbar 34 of the gate so that the gate can pivot upwardly and allow the bales to move out of the machine. It is to be noted, as shown in FIG. 2, that the u-shaped member 58 with its downwardly extending sides 56 and 57 is provided with latching cam members 71 and 72 which are pivotally attached respectively to the links 54 and the associated link on the other side of the machine and the cable 59 moves the latching mechanism upwardly about the pivot points 52 and the associated pivot point on the other side of the machine such that the latches 71 and 72 clear the locking bar 34 so that the end gate will pivot upwardly about pivot bar 36 thus allowing the bales to move out of the machine. As shown in FIGS. 2–5, the latch 71 is pivotally attached to the member 54 by pivot pin 73 which extends through the member 54, then through an opening formed in the latch 71. A washer 87 is mounted adjacent the latch 71 as shown in FIGS. 4 and 5, and a coil spring 83 is mounted about the pin 73 and has an end 86 which biases the latch 71 downwardly. The other end 84 of the spring 83 engages a member 81 through which the pin 73 passes as shown in FIG. 4. A pin 74 extends through the member 54 and through a spacer washer 82 and through the second end of the member 81 as shown in FIG. 4. A stop plate 76 is attached to the upper edge of the latch 71 and in the latched position engages the members 54 and 81 as shown in FIGS. 2, 4, and 5.

In operation, when the cable 59 is moved forward so as to pivot the members 56, 57, 58 and latches 71 and 72 upwardly, the rear gate locking bar 34 is released and swings upwardly due to the pressure of the bales in the accumulator and allows the bales to pass out of the machine as the accumulator is drawn forward over the ground. When the bales have cleared the gate, it swings down and the locking bar 34 engages the cam surface 70a of the latch 71 causing it to move upwardly against the spring 83 thus allowing the rear gate and the locking bar 34 to pass to the position shown in FIG. 2 at which time the latch mechanism is immediately biased downwardly to the locked position as shown in FIG. 2. It is to be realized, of course, that the latch 72 simultaneously operates in the same fashion to lock the gate. FIG. 3 illustrates the locking bar in solid position, engaging the surface 70a of latch 71 to cam it upwardly and allowing the locking bar 34 to pass under the latch to the latched position shown dotted.

It is seen that this invention comprises an improvement on the accumulator gate and latching mechanism illustrated in U.S. Pat. No. 3,779,402 in that when the gate moves downwardly to the locked position, rather than causing the entire locking structure to bounce upwardly and possibly miss locking the gate in the closed position, there is provided a pair of small spring biased latching members 71 and 72 which have small inertia and which positively lock after the locking bar 34 has passed beneath them so as to assure positive locking of the rear gate.

Although the invention has been described with respect to preferred embodiments, it is not to be so limited as changes and modifications may be made therein which are within the full intended scope as defined by the appended claims.

We claim as our invention:

1. An improved latch for an end gate for a bale accumulator comprising, an end gate pivotally attached at its upper end to said accumulator and having a transverse locking bar at its lower end, a U-shaped gate latch means having a cross member and downwardly extending legs pivotally connected to said accumulator and movable upwardly to unlatch said gate, a pair of spring biased pivotable movable latching cams mounted on said legs of said U-shaped gate latch means and each formed with a cam surface engageable with the opposite ends of said locking bar to lock said end gate to said accumulator, a release means connected to said U-shaped gate means to pivot said U-shaped latch means relative to said accumulator to a position where said latching cams are clear of said locking bar and said end gate can open said U-shaped latch means moveable relative to said accumulator to a position where it locks said end gate in a closed position with said spring biased movable latching cam means engaging said locking bar, and said U-shaped latching means capable of passing by said locking bar of said end gate to the locked position because said spring biased movable latching cams are pivoted upwardly by said locking bar when the ends of said locking bar engage their cam surfaces such that only said latching cams move to lock said end gate, and stops formed on said pivoted latching cams engageable with said U-shaped gate latch means to limit their movement in one direction.

* * * * *